Jan. 7, 1941.  H. S. COVER  2,227,959
RESPIRATOR FILTER
Filed Oct. 11, 1937   3 Sheets-Sheet 3
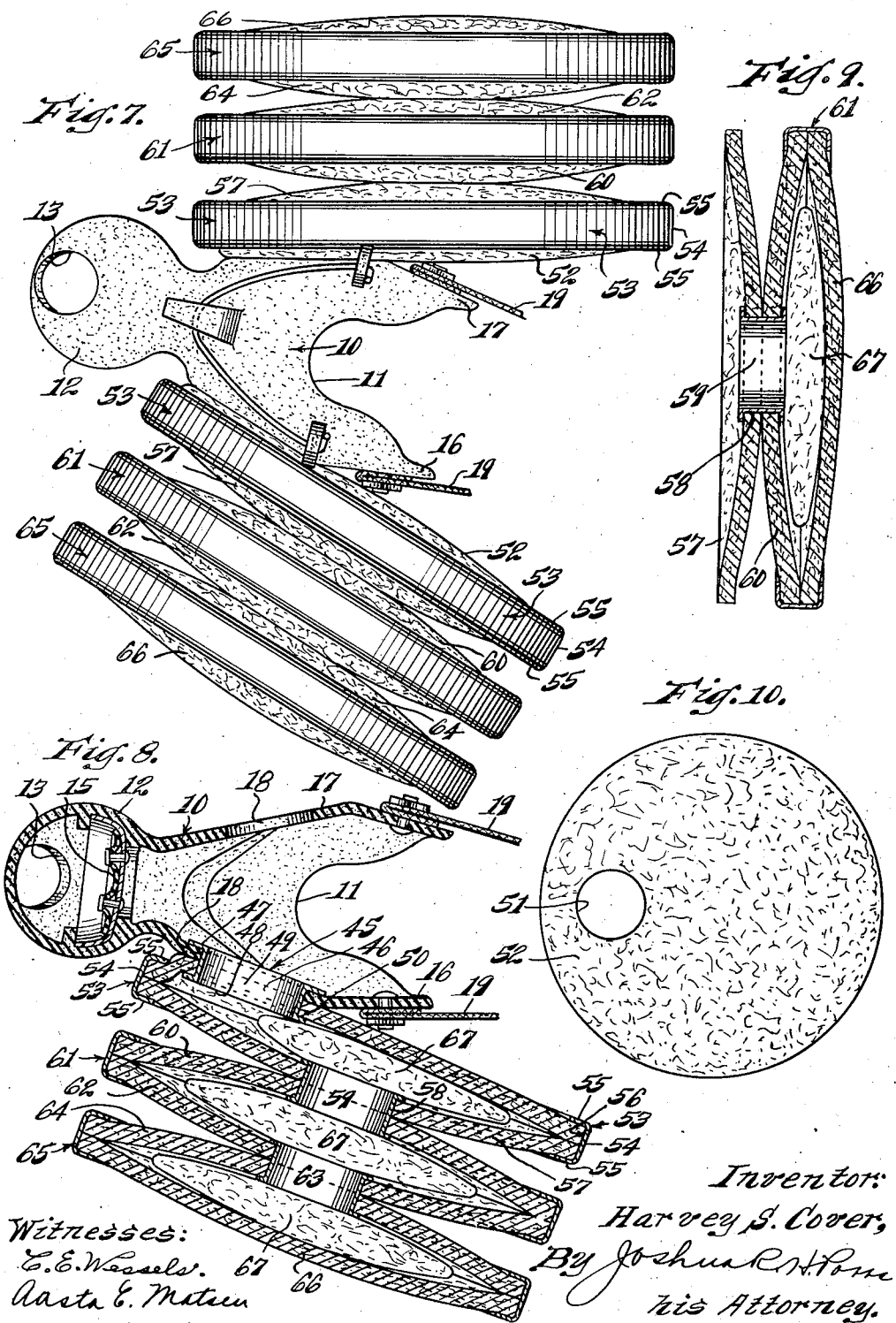

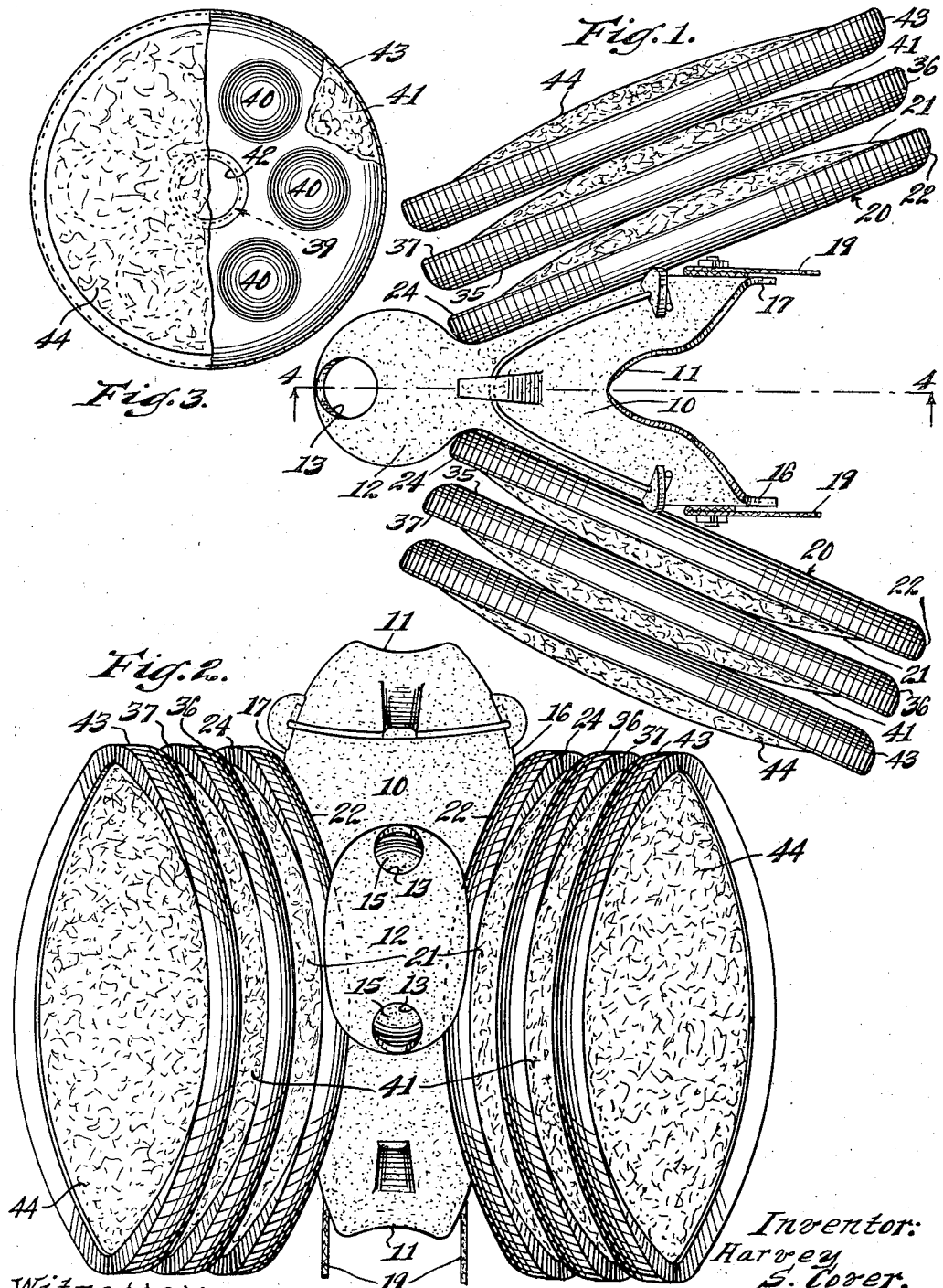

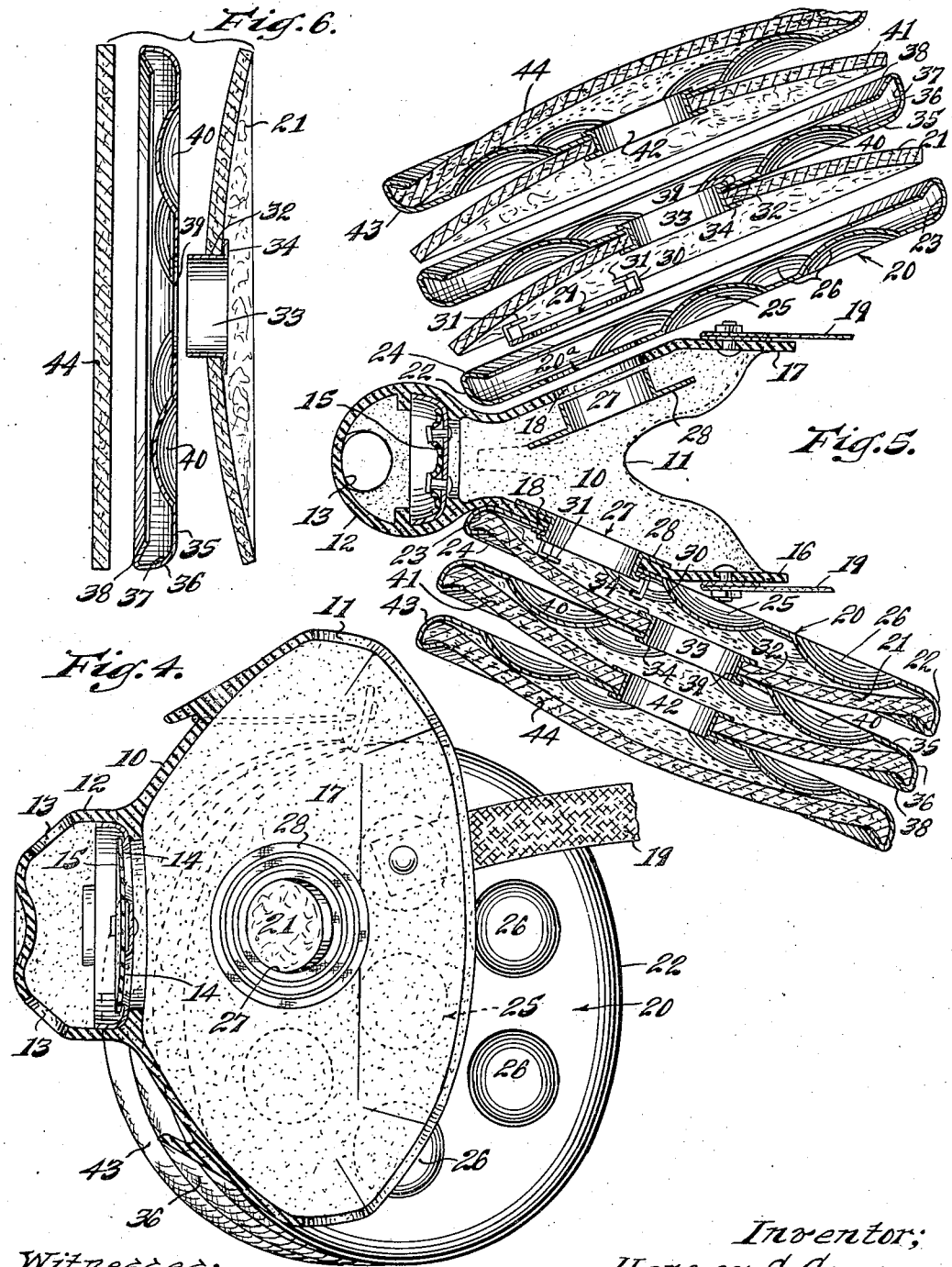

Patented Jan. 7, 1941

2,227,959

UNITED STATES PATENT OFFICE 2,227,959

RESPIRATOR FILTER

Harvey S. Cover, South Bend, Ind.

Application October 11, 1937, Serial No. 168,338

2 Claims. (Cl. 183—71)

This invention relates to improvements in respirators. It has for an object the production of an improved device to be used for protecting the user against dust, smoke, and noxious gases of various kinds;

Another object of the invention, among others, is to provide a respirator having a greatly increased filtering and inhaling area;

Another object is to accomplish a respirator of this character having not only maximum filtering area but maximum lightness; and Another object has been to produce a flow of air through the filter pads by a central outlet.

To this end I have provided a respirator having filter elements on opposite sides of the body portion, each element being composed of a plurality of individual filter units connected to each other. The filter units next to the body portion communicating by means of eccentric apertures and the filter units connecting with each other by means of concentric apertures. By my invention, I have provided, as will be readily understood by what appears hereinafter, respirators having clearly increased filter areas over anything ever heretofore known without any relative sacrifice of lightness of size.

Another object has been to provide a respirator of simple design which may be readily taken apart and in which filter units may be added or withdrawn in a very simple manner by the user. Pads may be inserted and adjusted with the greatest of ease by the insertion of the fingers in the openings provided and also the pads may be removed for changing or cleaning them.

It will be understood that the cavities in the filter units may be filled or occupied by any substance desired. For further filtration or treatment of the incoming air, medicated pads may be used. A sponge may be used, saturated with acids or alkalies to neutralize gases, or a substance such as activated charcoal or other granular substances, and a suitable check valve may be provided.

Another object has been production of a respirator of the kind described which is inexpensive in production and assembly.

Other objects and advantages will become apparent and be brought out more fully in the following specification, reference being had to the accompanying drawings, wherein:

Fig. 1 is a plan view of a preferred embodiment of my invention;

Fig. 2 is a face view of the same;

Fig. 3 is a face view of one of the filter units partly broken away;

Fig. 4 is a sectional elevation taken on the line 4—4 of Fig. 1;

Fig. 5 is a sectional view with elements shown in separated condition on one side of the respirator;

Fig. 6 is an exploded sectional view of a unit of the filter holder;

Fig. 7 is a plan view of a modified form of my invention;

Fig. 8 is a plan section of the body portion and the filter device on one side of the body portion;

Fig. 9 is a sectional view illustrating the means of uniting the outer unit of one filter to the next inner unit; and Fig. 10 is a plan view of the innermost pad.

Referring more particularly to the drawings, I show a respirator having a body portion 10 provided with cutouts 11 at the top and bottom to accommodate the nose and other portions of the face of the wearer. The body portion 10 in the form shown is made of rubber and is integral.

I also show a bulbous valve housing 12 having a pair of exhaust openings 13, the housing 12 enclosing a valve seat 14 which cooperates with an exhaust valve 15. The body portion 10 has also a rearwardly extending right wall 16 and a rear left wall 17, each provided with central aperture 18. A head strap 19 is provided and is secured to the walls 16 and 17 respectively by a nut and a bolt. The foregoing features are very clearly illustrated in Figs. 1, 2, 4 and 5.

In the form shown in Figs. 1 to 6, I have shown a respirator having a plurality of filter units on each side of the respirator. In Fig. 1 there is shown, for example, a metallic retaining plate 20, preferably circular in outline, although it will be understood that the precise shape is not essential to my invention, as the same may be either square or oval or otherwise as desired. Associated with the retaining plate 20 is a filter pad 21 of similar outline to the plate 20 and of the same or slightly larger area. The plate 20 has a circumferential curved edge portion 22 providing a cavity 23, and has a flanged edge portion 24. The plate 20 is also further provided with a central extrusion or hump 25 and a plurality of similar extruded portions 26 located around the central extrusion 25.

As clearly shown in Figs. 4, 5 and 6, there is provided a tubular locking member 27 provided with crimped flanges 28 and also there is provided a collar 29 having spaced legs 30 as clearly shown in Fig. 5. The metallic retaining plate 20 has an aperture 20a and a tubular locking member 27 is adapted to extend through the aperture 18, for example, of side wall 17, and then through the aperture 20a in a metallic retaining plate 20 and then through a collar 29. After the tubular member has been passed through as aforesaid, its unflanged end is flanged and crimped to lock the body portion to the retaining plate 20 and the collar 29 with the spacing legs 30, the spacing legs being provided with flanged feet 31 which lie against pad 21. It will be understood that the filter pad 21 is secured in place by the tucking of the peripheral edge of the pad into the cavity 23 of the retaining plate 20, the pad being secured in place by the flanged edge 24 of the plate 20. The pad may be somewhat thicker than the space provided between the edge and the base portion of the plate so that the pad may be compressed somewhat at the edges in order to make a secure fit. The pad will thus be seen to cover the bottom of the plate, although separated from the plate by the extrusions and the spacing legs in the form shown. It will be manifest from the foregoing that a tight and secure circumferential fit may be made with the pad and the edge of the plate, and also it will be further manifest that substantially the entire inner space of the pad 21 is available for the transmission of air since the surface of the pad 21 is separated from the base of the plate by the extrusions and the spacing legs, resulting in a number of passageways and air spaces between the interior surface of the pad 21 and the opening in the plate.

The pad 21, as clearly shown in the Figs. 5 and 6, has a central aperture 32 and a tubular flanged locking member 33 provided with flanges 34, is adapted to lock pad 21 to a retaining plate 35, as will be readily understood from the foregoing. The plate 35 has a curved edge portion 36 and a cavity 37 and a flanged edge portion 38. It also has a central aperture 39 through which the tubular member 33 extends. The plate 35 also has extrusions 40 similar to extrusions on plate 20 although arranged differently. That is, there is no central extrusion in plate 35, but instead of a central extrusion, there is in the plate 35 a circular aperture 39 with a ring of extrusions about the aperture 39. A pad 41, like the pad 21, is adapted to be tucked and secured in the cavity 37 of the plate 35 between the flanged edge portion and the base, as was the case with pad 21 in plate 20. A tubular locking flanged member 42 locks pad 41 to another retaining plate 43 which is similar to plate 35. Plate 43 has a pad 44 which is similar to the other pads except that it has no circular aperture, the circumferential edge of the pad 44 being tucked in the cavity 37 of the plate 43 as is the case with the other pads.

It will thus be seen that I have provided and described a respirator body having a filter element on one side, composed of three units connected to one another, and it will also be understood that there is provided a similar arrangement on the opposite side of the respirator. As shown in the figures of the drawings, there are three units on each side of the respirator. It will, of course, be understood that this number may be varied.

In the modified form shown in Figs. 7, 8, 9 and 10, there is a body portion which is similar to the body portion shown in Figs 1 to 6. Each of the rearwardly extending walls has an aperture 18. There is provided a tubular flanged locking member or grommet 45 having a cylindrical portion 46, an inner flange 47, an outer flange 48, a bore 49 and a groove 50 as clearly shown in Fig. 8. This grommet extends through an eccentric aperture 51 in a filter pad 52 in addition to the aperture 18 so as to lock a rearwardly extending wall to the pad 52. There is provided a channel ring 53 which, in the form shown, is made of aluminum, but which may be made of any suitable material, the channel ring having a web 54, flanges 55 and a circular recess 56. It will be understood that the pad 52 is adapted to have its peripheral edge tucked into the circular recess 56 of the channel ring 53 and, also, it will be understood that the pad 57 as clearly shown in Fig. 8 is also adapted to have its peripheral edge tucked into the circular recess 56 in the same channel ring 53. Thus a pair of pads 52 and 57 are adapted to be inserted in the channel ring 53, the pads presenting opposed marginal edges to each other. The pads may be thicker than the space between the flanges 55 of the channel ring 53 so that the pads may be compressed somewhat at the edges in order to make a secure fit.

The filter pad 57 in the form shown has a central aperture 58, and a grommet 59 is adapted to extend through this aperture 58 through a similar central aperture in the pad 60, which pad is similar to the pad 57, the grommet thereby locking the pads 60 and 57. A channel ring 61, similar to channel ring 53 is provided and is adapted to be supported by the pad 60 and is adapted to support a pad 62 similar to the pads 60 and 57, in a similar manner. The pad 62 has a similar circular opening to the pads 60 and 57 and a grommet 63, similar to the grommet 59, is adapted to extend through this opening in pad 62 into another similar opening in a pad 64, this pad 64 being similar to the pads 60, 57 and 62, the grommet 63 thereby locking the pad 62 to the pad 64 in a similar manner. Another channel ring 65 similar to channel ring 61 and 53, is supported by pad 64 and supports an outer pad 66, similar to the pad 44 shown in Figs. 1 to 6, and in a manner similar to that by which the other channel rings supported pairs of pads, there being no opening in the pad 66. It will also be understood that spacing elements 67 may be provided between the pairs of pads, as shown in Fig. 8, to space the pads in each pair of pads from each other.

It will be understood from the foregoing, in the modified form I have shown a filter element on each side of the respirator, each filter element consisting of three filter units. It will also be clear that the number of units on each side of the respirator may be changed or varied. It will also be understood that while I have described the units on one side of the respirator, the other side is provided with units similar in arrangement. By the arrangement shown in the modified form, the three units on each side of the respirator comprise surface areas through practically all of which air may be filtered, thus providing a filter element in which almost the entire area may be used for inhalation and filtration of air. In addition, the arrangement shown accomplishes the said result and yet has a desirable lightness, and, in fact, the arrangements shown have practically a maximum filter area with a maximum lightness, which lightness is a most important factor, as will be appreciated by those familiar with the art.

It will also be understood that the pads may be made slightly larger than the retaining plates when the pads are measured in their flat condition so that when the pads are inserted in the channel rings or retaining pads, the same may be caused to bulge out so as to create an air chamber between pairs of pads or between each pad and plate as the case may be.

While I have illustrated and described the preferred form of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. An air filter unit for a respirator comprising a series of elements detachably connected in pairs at their outer edges, the outer element comprising an imperforate wall and the remaining elements having openings therethrough, and means detachably connecting the adjacent walls of the successive pairs at their inner edges.

2. An air filter unit for a respirator comprising a series of superimposed elements, inturned annular flanges carried by the peripheries of alternate elements and into which the peripheries of the adjacent elements are detachably tucked, the outermost element comprising an imperforate wall and the remaining elements having openings therethrough, and outwardly flanged annular members extending through the openings of adjacent walls of successive pairs detachably connecting the same.

HARVEY S. COVER.